United States Patent
Akerman (10) Patent No.: US 10,039,294 B1
(45) Date of Patent: Aug. 7, 2018

(54) METHOD OF PRESERVING FOOD PRODUCT WITHOUT REFRIGERATION

(71) Applicant: Michael J Akerman, Passaic, NJ (US)

(72) Inventor: Emanuel Akerman, Mazkeret Batia (IL)

(73) Assignee: Michael J Akerman, Passaic, NJ (US)

( * ) Notice: Subject to any disclaimer, the term of this patent is extended or adjusted under 35 U.S.C. 154(b) by 0 days.

(21) Appl. No.: 15/482,903

(22) Filed: Apr. 10, 2017

Related U.S. Application Data (63) Continuation-in-part of application No. 14/153,827, filed on Jan. 13, 2014, now Pat. No. 9,629,375.

(51) Int. Cl.
| | |
|---|---|
| *A23B 5/14* | (2006.01) |
| *A23B 5/18* | (2006.01) |
| *A23B 7/10* | (2006.01) |
| *A23B 7/154* | (2006.01) |
| *A23B 7/157* | (2006.01) |
| *A23B 9/24* | (2006.01) |
| *A23B 9/26* | (2006.01) |
| *A23B 9/30* | (2006.01) |
| *A23B 4/20* | (2006.01) |
| *A23B 4/12* | (2006.01) |
| *A23B 4/24* | (2006.01) |
| *A23L 15/00* | (2016.01) |

(52) U.S. Cl.
CPC ............... *A23B 5/14* (2013.01); *A23L 15/00* (2016.08); *A23V 2002/00* (2013.01)

(58) Field of Classification Search
CPC . A23L 3/00; A23L 3/34; A23L 3/3454; A23L 3/3463; A23L 3/3481; A23L 3/3508; A23L 3/3589; A23B 4/00; A23B 4/12; A23B 4/20; A23B 4/24; A23B 5/14; A23B 5/005; A23B 5/0052; A23B 5/12; A23B 5/18; A23B 5/20; A23B 7/00; A23B 7/10; A23B 7/154; A23B 7/157; A23B 9/24; A23B 9/26; A23B 9/30
See application file for complete search history.

(56) References Cited

U.S. PATENT DOCUMENTS

| | | | | |
|---|---|---|---|---|
| 2,593,223 | A | * | 4/1952 | Trelease ............... A23B 5/0057 426/131 |
| 3,210,195 | A | * | 10/1965 | Kjelson et al. |
| 3,526,517 | A | * | 9/1970 | Shaffer et al. |
| 4,164,589 | A | * | 8/1979 | Kadane ................ A23B 4/0235 426/265 |

(Continued)

FOREIGN PATENT DOCUMENTS

| | | | |
|---|---|---|---|
| DE | 19915028 | * | 10/2000 |
| FR | 2413044 | * | 7/1997 |

(Continued)

*Primary Examiner* — Anthony J Weier
(74) *Attorney, Agent, or Firm* — Michael J. Feigin, Esq.; Feigin and Fridman (57) ABSTRACT

A food product is coated within an aqueous solution. The solution includes: at least one edible acid; and at least one osmotic agent, and wherein after the solution reaches equilibrium with the food product, the resultant pH of the solution is between about 1 and 4 and in some embodiments subsequently adjusted to between 3.5 and 5.5. The food product thus prepared remains deliciously palatable and safely edible for prolonged periods without refrigeration.

17 Claims, 2 Drawing Sheets

(56) References Cited

U.S. PATENT DOCUMENTS

| | | | |
|---|---|---|---|
| 5,858,446 A * | 1/1999 | Lewis et al. | |
| 6,475,539 B1 * | 11/2002 | DeWille et al. | |
| 9,629,375 B2 * | 1/2017 | Akerman | |
| 9,861,122 B2 * | 1/2018 | Kang et al. | |
| 2002/0039613 A1 * | 4/2002 | Bhatia et al. | |
| 2003/0148009 A1 * | 8/2003 | Bodor | A23B 7/10 |
| | | | 426/321 |
| 2006/0034994 A1 * | 2/2006 | Abboud | A23C 3/085 |
| | | | 426/580 |
| 2006/0062888 A1 * | 3/2006 | Shiiba et al. | |
| 2009/0053383 A1 * | 2/2009 | Endo et al. | |

FOREIGN PATENT DOCUMENTS

| | | | |
|---|---|---|---|
| JP | 59055177 | * | 3/1984 |
| KR | 1020080101258 | * | 11/2006 |

\* cited by examiner

METHOD OF PRESERVING FOOD PRODUCT WITHOUT REFRIGERATION

This application claims priority to U.S. patent application Ser. No. 14/153,827, filed Jun. 13, 2014, and now U.S. Pat. No. 9,629,375.

FIELD OF THE DISCLOSED TECHNOLOGY

The present invention relates to the food industry, and in particular to preserving food without refrigeration.

BACKGROUND OF THE DISCLOSED TECHNOLOGY

All food products are a potential substrate for microbiologic growth, which contributes to organoleptic deterioration of the food over time and also may present a health risk upon ingestion. Eggs as an example, do have a shell that offers limited protection from bacterial penetration. Still, a number of egg characteristics influence penetration, growth and spoilage by microorganisms. Before hatching, the egg passes through the end of the intestinal tract and thus is subjected to the micro-flora therein. In addition, eggs are highly sensitive to contamination by pathogenic microorganisms if not stored in proper conditions. Contaminants, like bacteria or molds, have the potential of spoiling the eggs or posing serious health risks to their consumers. Methods of preserving eggs for prolonged periods include refrigeration, cooking, freezing, drying and powdering, pasteurization and pickling. Pickled eggs are prepared by immersing cooked peeled eggs in an acidic solution, like vinegar, typically also containing salt, sugar, spices, or any combination of these ingredients. Methods for pickling raw eggs, or raw egg yolks, are also available. Pickled eggs prepared by such methods can be preserved for a period ranging from a few weeks up to several months.

The ingredients of the pickling solution, in addition to their contribution to the product's taste, odor, color and texture, have an active role in preventing the growth of contaminants. The optimal pH for the growth of ost microorganisms is near the neutral point (pH 7.0). As a result, the acidity of the pickling solution is adjusted to a pH lower than 7, thus contaminant growth is impeded.

Addition of sugar and salt increases the solute concentration in the pickling solution beyond the solute concentration in the contaminant cells, thus rendering the solution "hypertonic"; in other words, the addition of solutes to the pickling solution increases its osmotic pressure. Thus, the solutes in the solution are referred to as osmotic agents. Since the osmotic pressure inside the contaminants' cells is lower than the osmotic pressure of heir environment, water exits the contaminants' cells, thus lowering their viability. The above discussion is not meant to preclude the possibility that there may be additional mechanisms involved in the protection from microbiological contamination and spoilage accomplished through treating food products with this invention.

Methods for preserving food items are disclosed for example in German application number DE 19915928 A1, Japanese patent document JP S59-55177, U.S. Pat. No. 7,455,866 B2, and French patent document FR 2413044,

SUMMARY OF THE DISCLOSED TECHNOLOGY

A method of preserving food products of embodiments of the disclosed technology functions by placing a food product in an aqueous solution having an acidic pH which, in some embodiments, flash (quickly, e.g. in under 10 minutes, 5 minutes, or 1 minute) kills and/or inhibits further growth of any bacteria. Tests have been run at pHs of 4, 3.5, 3, 2, 1, and 0. The aqueous solution has a polyol, acid and salt. The pH is then raised or adjusted until it is at 3.5, 4, 4.5, 5, 5.5 or 6 and kept this way for a long period of time. At this pH, damage to the food is limited, but the bacteria growth is minimized or kept at zero. At least some of said aqueous solution with the food in an air-tight container is then kept for a long period of time. This period of time can be one week, two week, four weeks, six weeks, one month, two months, six months, one year, two years, five years or more. It is believed that the results will work, in an air-tight container, for any length of time, though due to time constraints, periods of time of up to five years have been tested. Based on the knowledge of the inventor, the method should work for even greater periods of time based on correlating the known data over longer periods of time under the same conditions as listed above.

When using the above method and order of preserving food products, after the periods of time described above, the airtight container was opened at least a milliliter (ml) of material was tested. In each case, the solution was found to be clear in color, the food was intact in it's original shape, color, and/or texture, and the food and the solution lacked any malodorous scent. This occurred, in embodiments of the disclosed technology, even when during the storage of the air-tight container for the periods of time described, the container was kept at room temperature which varied between 15 and 38 degrees Celsius. In some embodiments, room temperature was between 15 and 25 degrees Celsius.

The malodorous scent, if existing, would be one which is uncharacteristic of the food placed in the solution and/or offensive to a person who otherwise likes to eat the particular food product.

The bacterial count of the solution, per milliliter of solution when tested immediately (within 5 minutes) of opening the airtight container was found to be zero or less than 10 in each embodiment of the disclosed technology. This is for various types of food products regardless of the method of cooking. This included pasta, grain, tofu, vegetable, fruit, cheese product, meat, and fish. This included also types of cooking or pre-treatment including boiling, frying, poaching, cooking, baking and roasting.

The present invention relates to preserving a food product without refrigeration, as for an example, an egg.

In accordance with embodiments of one aspect of the present invention there is provided a food product within an aqueous solution, the solution comprising: at least one edible acid; and at least one osmotic agent, wherein after the solution reaches equilibrium with the food product, the pH of the solution is between about 1 and 4.

In accordance with embodiments of another aspect of the present invention there is provided a method of preserving a food product, comprising: (a) immersing the food product in an aqueous solution; (b) adding an osmotic agent to the solution; (c) adding at least one edible acid to the solution; and (d) adjusting the pH of the solution to a final range of 3.5-5.

The uniqueness of the present invention and methodology is its ability to maintain food in a fresh tasting state without refrigeration. The method through various embodiments is uniquely applicable to a wide variety of food products.

The term "or" includes both terms joined by the term and either term by itself. Any item described can "comprise" or "consist of" what is described. Any item described can be as described or "substantially" as described, which is defined as at least 90% of what is described.

BRIEF DESCRIPTION OF THE DRAWINGS

The present invention will be understood and appreciated more fully from the following detailed description taken in conjunction with the appended drawings in which.

The following detailed description of embodiments of the invention refers to the accompanying drawings referred to above. Wherever possible, the same reference numbers will be used throughout the drawings and the following description to refer to the same and like parts.

DETAILED DESCRIPTION OF EMBODIMENTS OF THE DISCLOSED TECHNOLOGY

A method of preserving food products of embodiments of the disclosed technology functions by placing a food product in an aqueous solution having an acidic pH which flash (quickly, e.g. in under 10 minutes, 5 minutes, or 1 minute) kills any bacteria. Tests have been run at pHs of 4, 3.5, 3, 2, 1, and 0. The aqueous solution has a polyol, acid and salt. The pH is then raised or adjusted until it is at 3.5, 4, 4.5, 5, 5.5 or 6 and kept this way for a long period of time. At this pH, along with the synergy of the other osmotic agents in solution in some embodiments, damage to the food is limited, but the bacteria growth is minimized or kept at zero. At least some of said aqueous solution with the food in an air-tight container is then kept for a long period of time. This period of time can be one week, two week, four weeks, six weeks, one month, two months, six months, one year, two years, five years or more. It is believed that the results will work, in an air-tight container, for any length of time, though due to time constraints, periods of time of up to five years have been tested. Based on the knowledge of the inventor, the method should work for even greater periods of time based on correlating the known data over longer periods of time under the same conditions as listed above.

When using the above method and order of preserving food products, after the periods of time described above, the airtight container was opened at least a milliliter (ml) of material was tested. In each case, the solution was found to be clear in color, the food was intact in it's original shape, color, and/or texture, and the food and the solution lacked any malodorous scent. This occurred, in embodiments of the disclosed technology, even when during the storage of the air-tight container for the periods of time described, the container was kept at room temperature which varied between 15 and 38 degrees Celsius. In some embodiments, room temperature was between 15 and 25 degrees Celsius.

The malodorous scent, if existing, would be one which is uncharacteristic of the food placed in the solution and/or offensive to a person who otherwise likes to eat the particular food product.

The bacterial count of the solution, per milliliter of solution when tested immediately (within 5 minutes) of opening the airtight container was found to be zero or less than 10 in each embodiment of the disclosed technology. This is for various types of food products regardless of the method of cooking. This included pasta, grain, tofu, vegetable, fruit, cheese product, meat, and fish. This included also types of cooking or pre-treatment including boiling, frying, poaching, cooking, baking and roasting.

It is a particular feature of embodiments of the present invention, to provide a food preserving method, using pH reducing substances in a solution, combined with one or more osmotic agents, to provide a food product having an extended shelf-life at ambient temperature.

At the same time, the method does not deleteriously affect the taste or other organoleptic aspects of the food product.

Figure 1:
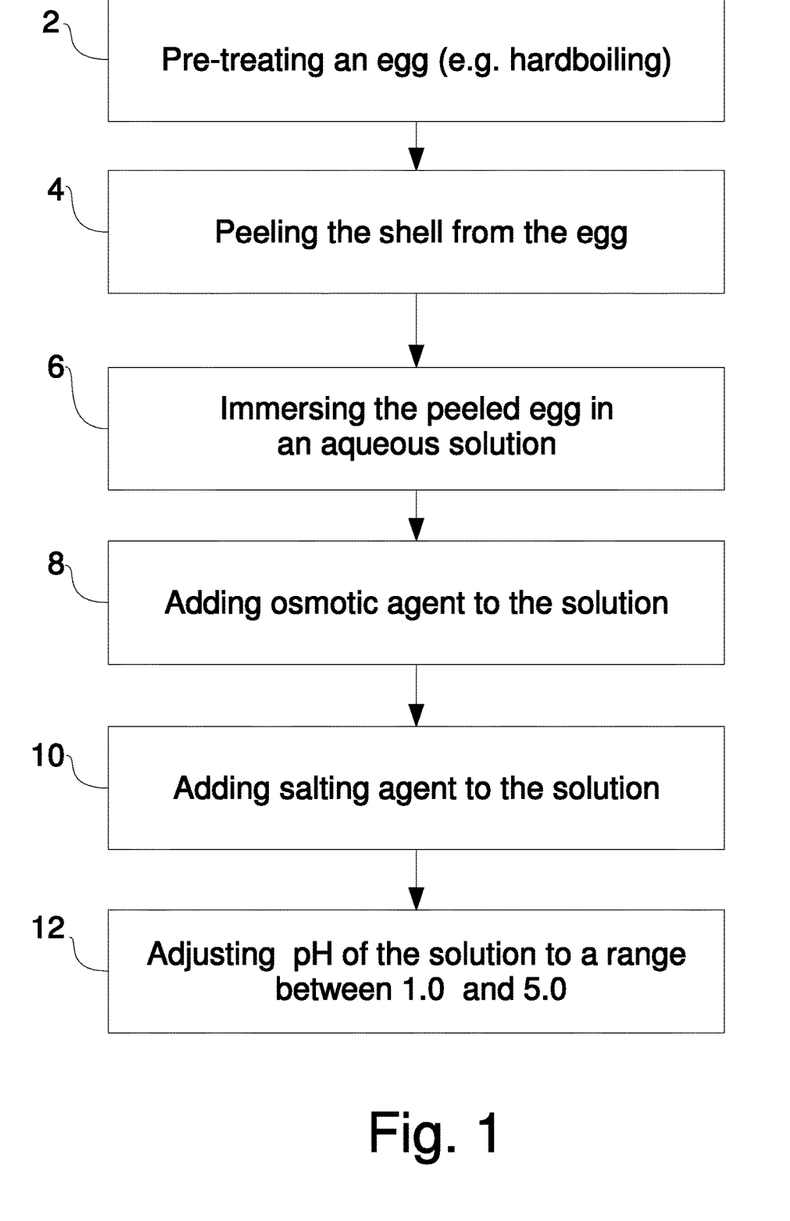
FIG. 1 is a flowchart of an embodiment of a method of preserving an egg in accordance with the present invention.

FIG. 1 shows a flowchart depicting the steps of an embodiment of a method/process of preserving an egg. Step 2 includes pre-treating the egg by hard-boiling a whole egg including the egg shell; step 4, peeling the shell from the hard-boiled egg (manually or otherwise); step 6, immersing the peeled egg in an aqueous solution; step 8, adding one or more osmotic agents to the solution; step 10, adding salting agents to the solution; and in step 12, adjusting the pH of the solution to a final pH between 1.0 to 5.0 (preferably 2.0 to 4.0), by adding one or more pH reduction substances, i.e. edible strong acids, edible weak acids or a combination thereof to the solution.

In step 8, osmotic agents are added to the solution to increase the concentration of solutes within the solution to a concentration which is sufficiently higher than the expected concentration of microorganisms in the solution, i.e. a hypertonic concentration. As a result, dehydration of the cells of the microorganisms occurs, whereby a substantial amount of the microorganisms within the solution are destroyed.

Sugars such as sucrose, maltose dextrose and fructose, in addition to their sweetening effect, can be used as osmotic agents. However, such sugars may have the side effect of promoting fermentation of bacteria or other microorganisms, which may be undesirable. Alternatively, sweeteners such as, polyols, which are not fermentable or utilized by microorganisms and still contribute to the sweetness of the egg, can be used as osmotic agents.

Exemplary polyol osmotic agents suitable for the method of the present invention include: glycerol (glycerin), erythritol, hydrogenated glucose hydrolysates (HGH), inositol, isomalt, lactitol, maltitol, mannitol, polyglycitol (Hydrogenated Starch Hydrolysates—HSH), sorbitol and xylitol. They can be used either singly or in combination.

In step 10, salting agents are added to the solution to provide flavoring to the eggs, as well as to provide a preserving effect by increasing the hypertonicity of the solution, thereby reinforcing the osmotic pressure therein. In some embodiments, salting agents are used as osmotic agents as well. The salting agents can be used either instead of the polyols or in addition thereto.

Exemplary salting agents suitable for the method of the present invention include: potassium chloride, potassium lactate, sodium chloride and sodium nitrate; as well as combination salts or any of the various naturally occurring or extracted edible salts such as Black Salt, Himalayan Pink Salt, and Sea Salt. These agents can be used singly or in combination depending on the food product and the desired taste.

In some embodiments, adjusting the pH of the solution (step 12) is carried out in two stages. In a first stage, weak acids, strong acids or combination thereof are added to the solution. This first stage brings the pH of the solution to the approximately desired pH range (typically between 2 and 4). In the second stage, an additional controlled amount of acid is added if necessary for desired pH adjustment. Typically, this second stage is carried out if after a sufficient equilibration period the basic pH of the egg (immersed in the solution) increases the pH level of the solution above the desired pH range (usually pH 2-4).

In some embodiments of this invention, if after the first or second stage the pH of the solution is lower than the desired pH range, one or more edible alkalinic agents are added to the solution. Furthermore, the reaction between the alkalinic agents and the edible acids can provide an additional source of salts to the solution. As mentioned, salts and/or salting agents are optional osmotic agents.

Edible acids usable in the method of the present invention can be organic or inorganic acids; and include, for example, acetic acid, adipic acid, aminoacetic acid, ascorbic acid, aspartic acid, boric acid, butyric acid, caffeic acid, caffeotannic acid, caprylic acid, carbonic acid, chlorogenic acid, cinnamic acid, citric acid, corosolic acid, formic acid, fumaric acid (boletic acid), gallic acid (3,4,5-trihydroxybenzoic acid), gluconic acid, glutamic acid, hyaluronic acid, hydrochloric acid, lactic acid, linoleic acid, malic acid, meta tartaric acid, oxalic acid, phenylacetic acid, phosphoric acid, phytic acid, salicylic acid, sialic acid, succinic acid, sulphuric acid, tannic acid, tartaric acid, thiodipropionic acid and vinegar e.g. made of cider, red wine, white wine or rice. These edible acids can be used either singly or in combination. Preferred acids that do not leave an acrid, sour or tart aftertaste are preferable; for example, citric and malic acids, and low concentration vinegar.

It should be noted, that when using weak acids, for example, acetic acid, the undissociated molecule of the weak acid, as well as the portion that is ionized, plays a role in the osmotic relationship between the solution surrounding the egg and any possibly microbial cell, i.e. weak acids perform the function of osmotic agents as well.

It should be noted that, in the context of eggs, the preserving process of the present invention can be adapted for use not only with a hard-boiled egg, but for a fried egg as well. In such case, step 2 of the process is frying the egg instead of hard-boiling the egg. The same goes for poached and scrambled eggs and the like, mutatis mutandis. Various embodiments of this process have been tested and shown to be effective in preserving fried, poached and scrambled eggs as well as with other food products and food groups as listed further on.

Figure 2:
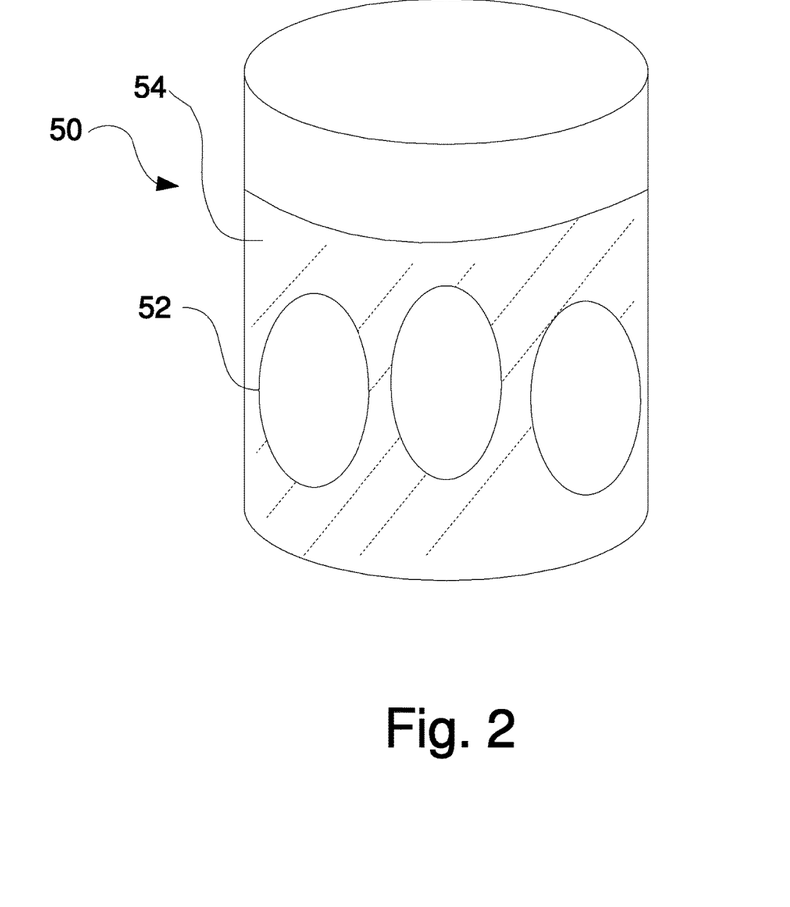
FIG. 2 is a perspective view of an embodiment of a food product in accordance with the present invention.

FIG. 2 depicts an illustration of an egg product (arrow 50) using the present invention, in this embodiment: a cooked egg (arrow 52) (typically shelled), preserved in an aqueous solution (arrow 54). The solution includes one or more edible acids and one or more osmotic agents and the final pH of the solution is 1-5, and preferably 2-4. The pH adjustment is carried out either by adding one or more edible acids to the aqueous solution; and in some embodiments includes alkalinic agents. The osmotic agents create an osmotic pressure to impede growth of contaminant microorganisms as explained above.

In some embodiments, one or more salting agents are added to the solution, mostly for flavoring. However they may act as osmotic agents as well.

In some embodiments of this process, one or more of the agents used to produce the aqueous solution are initially solid, typically in powder or granular form. Some, and perhaps nearly all of the appropriate osmotic agents, in particular the polyols and sugars, are available in powder or granular form; some, and perhaps nearly all of the appropriate edible acids are available in powder or granular form, especially some of the organic acids, but perhaps some inorganic acids as well. As such, the powder or granules can be mixed and then dissolved in water. Similarly, the edible alkalinic agents, which may be added after the first or second stage if the pH of the solution is lower than the desired pH range, can also be provided in a solid form.

Experimental evidence has shown several species of bacteria commonly associated with eggs are affected by a low pH level. In particular, we have found that a pH level of 2-4 is most suitable for inhibiting the growth and presence of contaminant microorganisms within the egg/solution. However, with the present methodology a pH level of 1-5 can be used as well.

The five experiments in the below examples were monitored in accordance with the regulations of the Ministry of Health in Israel.

Example 1

Nine peeled hard-boiled small chicken eggs were immersed in 200 grams of 5% vinegar to which 70 grams of glycerin and 50 grams of boiling water containing 13.5 grams of sodium chloride were added. The initial pH of the mixed (preserving) solution was about 3.0. Analytical tests revealed that the pH of the chicken eggs was 4.0; the pH of the preserving solution was 4.2; and after two weeks the total bacterial count of the chicken eggs was less than 10 as was the count for the preserving solution. Two weeks after immersion, the chicken eggs were tasted by six people with very positive responses.

Example 2

Nine peeled, hard-boiled small chicken eggs were immersed in a solution of 100 g vinegar (5% acetic acid) from "Osem Investments Ltd.", Petah Tikva, Israel, containing 35 g of glycerin, 13.5 g of table salt (NaCl) and 35 g of 1 N HCl. The resultant pH was initially about 2.5. After about 20 hours, the pH rose to 4.5 at which time 20 cc of 1N HCL was added to lower the pH again to 2.5.

Example 3

Nine peeled hard-boiled small chicken eggs were immersed in 100 g vinegar (5% acetic acid) from "Osem Investments Ltd.", Petah Tikva, Israel; 50 cc of about 7% by weight of HCl; 70 g of glycerin; 18 g of table salt; and 100 g of bottled water. The initial pH was about 0.5. After 2 hours, 130 ml of 1 N NaOH was added and the pH rose to a range of 3.0-3.5.

Example 3 was repeated except citric acid (5 g of in 100 cc of bottled water) was used instead of vinegar, and after 2 hours 10 g of 7% HCl solution was added. The resulting pH was 1.5-2.0. This was followed by neutralization with about 35 ml of 1 N NaOH which brought the pH to about 3.0. Five days later, the chicken eggs had a good aroma and taste.

Example 4 was repeated, however with pheasant eggs, weighing about 13 g each. After about 12 hours the pH was about 3.0-3.5 and both the aroma and taste were quite good.

As above-mentioned, additional food groups and products may be applicably used with the process of the present invention. Exemplary food products include, but are not limited to: relatively high-protein foods, such as cheese (or other suitable dairy product); meat products; fish products; soya products (in particular, tofu); macaroni, pasta, cooked, fried or baked cereal grain or flour based products; fruits; and vegetables. Food prepared from these food products and food groups have been tested with this method described in this patent and found as suitable for preserving in the way taught by the present invention. In such applications, steps 2 and 4 of the process may be appropriately skipped or adjusted to other pre-treating actions as needed for that food, for example cutting the cheese product to portions or size to be easily immersed within the solution or the like.

Additional embodiments of the disclosed technology which have been discovered through experimentation. We are reporting below the following representative experimental examples. These examples are not meant to be restrictive but rather to illustrate the wide variety of prepared food products and food groups that can be preserved at room temperature with various embodiments of the application of this methodology and process. Room temperature was measured as ranging seasonally from 15 degrees Celsius to 38 degree C. on any given day. The experimental examples illustrate not only the broad food type application of this invention and process, but the very long duration of food storage at room temperature that can be achieved without refrigeration or vacuum packing.

The ten experiments in the examples below are illustrative of the applicability and effectiveness of this preservation method with a wide range of other food products and for long periods of shelf life:

Experiment 1

Test of Macaroni Wheat Grain Product Preserved with the Present Invention.

A sample of grain product, namely a cooked pasta (wheat flour, as a bow shaped macaroni bought as a standard dry consumer food product) was tested with the present method as follows: The food storage solution used consisted of the following proportions of ingredients: a) Citric Acid 1000 gm, b) HCL 50 gm, c) Glycerol 500 gm, d) Salt (NaCl) 200 gm, and e) Water 1,150 gram. The strained, cooked pasta (bow shaped pieces) was transferred from the colander to loosely fill a 250 ml container. The pasta was closely spaced as typically occurs after straining out water. Only enough of the above described solution was added to the container to reach a level that simply covered the top surface of the pasta. After several hours the pasta pieces had swelled slightly. The pasta visibly maintained its shape and texture appearances. The pH of the solution at equilibrium with the pasta was 4.0. NaOH was then added the pH to titrate the pH to 5.0. The container was hand-closed and kept at room temperature (temperature seasonally varied from approximately 15 degrees C. to 38 degrees C.).

Each month for a period between Jun. 12, 2011 and Mar. 10, 2017 the pasta underwent organoleptic evaluation, initially monthly and after one year quarterly. The results were as follows:
a) On visual inspection the liquid above and between the pasta pieces remained clear. b) Pasta pieces remained solid and intact in their original shape and form (with the swelling of size noted above). c) On olfactory inspection there was no malodorous scent at any time.
d) On Mar. 10, 2017 the contents were removed for organoleptic assessment of tactile feel and assessment of taste and for microbiologic testing. The aroma upon opening the container was that of freshly cooked pasta macaroni and with a slight acetic (mild vinegar-like) odor. The measured pH of the liquid phase was 4.0-4.5. e) The palpable macaroni texture was solid with a starchy residue and the original visual color and shape was intact. e) The taste of the pasta macaroni after the 5.6 years of storage at this room temperature was palatable and clearly that of macaroni, but with a starchy and slightly gritty oral residue. f) A sample of the liquid phase surrounding the pasta was tested for microbial contamination using Hardy Diagnostics Compact Dry™ TC media plates according to the manufacturer's directions. (Compact Dry™ TC is a chromogenic culture medium used as a standard in the food industry for screening for viable aerobic bacterial counts in food safety monitoring). There was no bacterial growth.

Experiments 2 and 3

Tests of Cheese and Tofu Products Preserved with the Present Invention.

Samples of a hard cheese product (mozzarella cheese sticks) and a sample of a tofu product were purchased from a supermarket refrigerated section with expiration dates listed as occurring within a typical refrigerated shelf life span of a few weeks for the Tofu and a few months for the cheese sticks. They were each respectively placed to fill 250 ml containers. The preservation solution used with these two food products consisted of the following:
a) Citric Acid 50 gm added to 950 gm H2O. b) HCL 50 gm in 150 gm water. c) Glycerol 500 gm in 500 gm water.
d) Salt (NaCl) 200 gm in 500 gm water.

The tofu pieces were cut into 4 cm squares with 1 cm depth. Cheese sticks used were 1 cm diameter and 10 cm long. On Jun. 3, 2011 the tofu cubes and on Jan. 2, 2012 the cheese sticks were each placed to loosely fill a 250 ml container. Each was then covered with only enough solution to reach a level above their solid surface level. The pH of the solution after equilibrium was 1.5. With NaOH the pH was titrated in increments to 5.0. The containers were hand-closed and stored at room temperature (room temperature varied seasonally from approximately 15 degrees C. to 38 degrees C.).

From the initial preparation date starting Jun. 3, 2011 for the tofu and beginning Jan. 2, 2012 for the cheese sticks, and ending on Mar. 10, 2017 for both the cheese and tofu specimens, each container underwent organoleptic evaluation, initially monthly and after one year quarterly. The findings were as follows: a) On visual inspection the liquid phase surrounding and between the cheese and tofu pieces remained clear and transparent. b) Pieces of tofu and cheese sticks each remained intact in their original shape and form. c) On olfactory inspection there was no malodorous scent at any time.
d) On Mar. 10, 2017 the contents were removed for organoleptic assessment of tactile feel and assessment of taste and for microbiologic testing. The cheese was solid and had a starchy residue and retained it's original coloration. The tofu was solid and held its shape and color, but crumbled with mild pressure. The aroma upon opening the container was still that of cheese and that of tofu respectively but with a slight acidic odor (mild vinegar-like odor). e) The taste of the tofu and the cheese respectively after the more than five years of storage was palatable and obviously that of tofu or cheese respectively, but with a starchy, slightly gritty oral residue. f) A sample of the liquid phase surrounding the pasta was tested for microbial contamination using Hardy Diagnostics Compact Dry™ TC media plates according to the manufacturer's directions. There was no bacterial growth.

Experiments 4 and 5

Examples of Cooked Vegetables Tested with this Preservation Method are as Follows:

On Mar. 11, 2011 freshly cooked unpeeled potato and cooked unpeeled carrot were placed together to loosely fill one 250 ml container, and cooked peas and stringbeans were placed together to loosely fill a separate 250 ml container. On Mar. 11, 2011 the following embodiment of the solution was added to fill the container to only cover the surface of the vegetables: a) Citric Acid 75 gm added to 1425 gm H2O, b) HCL 75 gm (37% strength) in 225 gm water, c) Glycerine 750 gm, and d) Salt (NaCl) 300 gm in 300 gm water. This solution had a pH of less than 1.0. After the initial equilibrium was reached in each container the pH was further adjusted by adding 1 M NaOH until the fluid phase in each container reached a pH of 5.0. Initially when the fluid was added to the container the vegetable had slightly floated upward in the solution (lifted off the bottom of the container to the small amount of space that was available). After two days the vegetables settled to the bottom and swelled slightly. The containers were hand-closed and kept at room temperature (room temperature varied seasonally from approximately 15 degrees C. to 38 degrees C.). Each month for a period between the initial preparation starting Mar. 11, 2011 and ending on Mar. 10, 2017 they each underwent organoleptic evaluation, initially monthly and after one year quarterly. The findings were as follows: a) On visual inspection the liquid phase surrounding the vegetables in each remained clear and transparent. b) The potato, carrot, peas and stringbeans each remained intact in their original color, shape and form. c) On olfactory inspection there was no malodorous scent at any time. d) On Mar. 10, 2017 the contents were removed for organoleptic assessment of tactile feel and assessment of taste and for microbiologic testing. The vegetables all retained their shape and color when being lifted from the containers. The aroma upon opening the container was similar to the expected odor of these vegetables when freshly cooked. There was no acetic odor. e) The taste of the vegetables after the more than five years of storage was palatable and recognizably that of the respective vegetables. The consistency in the mouth was slightly softer than that of the freshly cooked vegetable. f) A sample of the liquid phase surrounding the pasta was tested for microbial contamination using Hardy Diagnostics Compact Dry™ TC media plates according to the manufacturer's directions. There was no bacterial growth.

Experiments 6, 7 and 8

Testing of Preservation of Meat and Fish Products with the Present Invention.

Samples of various meat and fish products were also tested. This included: (Experiment 6). a 250 ml container filled with freshly cooked (boiled) chopped chicken balls (ingredients: One kilogram chopped chicken meat, two eggs, 100 gm matzah meal, spices (salt, pepper, paprika and other spices to taste). (Experiment 7). a 250 ml container filled with freshly fried breaded boneless seasoned chicken breast herein referred to as chicken schnitzel (ingredients: chicken, 3 eggs, one ground carrot and one ground potato, half cup matzah flour, half teaspoon salt, half teaspoon sweet paprika, quarter cup ground coriander). (Experiment 8). Fresh deep fried Fish balls were added to fill a 250 ml container (ingredients: One kilo chopped ground fish, 3 eggs, one ground carrot and one ground potato, half cup matzah flour, half teaspoon salt, half teaspoon sweet paprika, quarter cup ground coriander).

Frying was accomplished in soy oil at low flame temperature to allow for good deep cooking. The inner core temperature of the meat and fish was measured and reaching above the recommended temperature to render the respective fish or meat product as sterile and safe to eat. A preservative solution was prepared based on principles of the present method was added to fill over the food surface in each of the three containers. The solution used consisted of Citric Acid 75 gm added to 1425 gm H2O, HCL 75 gm (37% strength) in 225 gm water, Glycerin 750 gm. Salt (NaCl) 300 gm in 300 gm water. The solution had an initial pH<1.0. After equilibrium pH was reached the container pH was adjusted by adding 1 M NaOH to reach a pH of 5.0.

The three respective experimental containers were prepared on Oct. 17, 2012. The containers were hand-closed and kept at room temperature (room temperature varied seasonally from approximately 15 degrees C. to 38 degrees C.). Each month for a period between the initial preparation starting Oct. 17, 2012 and ending on Mar. 10, 2017 they each underwent organoleptic evaluation, initially monthly and after one year quarterly. The findings were as follows: a) On visual inspection the liquid phase surrounding the meat or fish in each container remained clear and transparent. b) the boiled chicken balls, the fish balls and the chicken schnitzel each remained intact in their original shape and form. c) On olfactory inspection there was no malodorous scent at any time.

d) On Mar. 10, 2017 the contents were removed for organoleptic assessment of tactile feel and assessment of taste and for microbiologic testing. The prepared meat and fish products all retained their shape and color when being lifted from the containers. The aroma upon opening the container was similar to the expected odor of the freshly fried meat or fish portions when freshly prepared. There was also a mild sweet and with a very slight vinegar-like pungent odor. e) All of the fish and meat samples, after the more than four years of storage at room temperature was palatable and recognizably that of the respective food products. Specifically though, the fried fish balls had a slight sweetened taste. The consistency in the mouth was not gritty nor starchy. The chicken schnitzel had retained a small amount of breading. The remaining breading had precipitated in the container. The schnitzel retained its structure and did not fall apart when handled. It was soft to chew and had a sweetish tinge to the taste. The cooked chicken balls had a slightly starchy aftertaste and feel. f) A sample of the liquid phase surrounding the pasta was tested for microbial contamination using Hardy Diagnostics Compact Dry™ TC media plates according to the manufacturer's directions. There was no bacterial growth.

Experiments 9 and 10

The Proposed Invention was Tested Out on Samples of Cooked Fruit.

Apples were cooked with the peel intact on the apple. Cherries were cooked fully intact. These two respective samples in containers were prepared on Feb. 22, 2013. They were placed respectively to each loosely fill a 250 ml container. After that, the initial preservation solution was added (as in the prior examples). After it reached equilibrium, the pH was adjusted to 3.5 with 20 gm 1N NaOH. In a second adjustment ast the pH was brought up to pH 5.0. The apples and cherries retained their color and shape and remained intact but swelled larger than initial cooked size. They settled to the bottom.

The containers were hand-closed and kept at room temperature (room temperature varied seasonally from approximately 15 degrees C. to 38 degrees C.).

Each month for a period between the initial preparation starting Feb. 22, 2013 and ending on Mar. 10, 2017 they each underwent organoleptic evaluation, initially monthly and after one year quarterly. The findings were as follows: a) On visual inspection the liquid phase surrounding the fruit in each container remained clear and transparent. b) the apple and cherries each remained intact in their original shape and form. c) On olfactory inspection there was no malodorous scent at any time. d) On Mar. 10, 2017 the contents were removed for organoleptic assessment of tactile feel and assessment of taste and for microbiologic testing. The cooked apple and cherries retained their shape. The aroma upon opening the container was similar to the expected odor of the freshly cooked fruit. There was no acetic odor. e) The fruit samples, after the more than three years of storage at the variable room temperature, was palatable and recognizably that of the respective fruit products. f) A sample of the liquid phase surrounding the pasta was tested for microbial contamination using Hardy Diagnostics Compact Dry™ TC media plates according to the manufacturer's directions. There was no bacterial growth.

Additional Details of the Present Invention

In some embodiments of this process, one or more of the agents used to produce the aqueous solution are initially solid, typically in powder or granular form. Some, and perhaps nearly all of the appropriate osmotic agents, in particular the polyols and sugars, are available in powder or granular form; some, and perhaps nearly all of the appropriate edible acids are available in powder or granular form, especially some of the organic acids, but perhaps some inorganic acids as well. As such, the powder or granules can be mixed and then dissolved in water. Similarly, the edible alkalinic agents, which may be added after the first or second stage if the pH of the solution is lower than the desired pH range, can also be provided in a solid form.

Further, in some of the above examples, all required ingredients (as in some embodiments of the disclosed technology) are initially in their powder or granular form (osmotic agent (polyols), salt, and organic acid) and together combined in their required respective ratios directly into either cold, tepid or warm solutions into which the prepared food products are immersed. Then powder or solution of inorganic acids or bases may be added to adjust final pH to the desired range. However they may act as osmotic agents as well. In some embodiments, one or more salting agents may be added to the solution or removed from the solution. This choice would be done, mostly for flavoring considerations.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above. Examples of some of the additional embodiments of this method that we have investigated include using a premixed prepared dry powder combination of the various compounds; utilizing a spray on food coating formulation of the ingredients; or using substantial variations in the proportion of different osmotic agents including substantial reductions in the added salt concentrations.

Additional Experiments for Shorter Time Periods (3 Weeks):

The following foods were separately prepared by either cooking, frying, boiling or roasting and placed in a container after the cooking process. The foods were: cooked Durham Wheat Elbow Macaroni Pasta; Roast Beef (seasoned with spices); cooked small whole zucchini approximately 5 inch size; Baked Fillet of Salmon (skin on one side, seasoned with sesame and spices); Sliced Munster Cheese (natural brand of cheese with no added preservatives in the original cheese).

To the food filled container an embodiment of the present invention consisting of a solution containing a mix of an acid, a salt and a polyol were added. The initial pH was between 1 and 2. The pH was adjusted so that the final pH was 4.0. The pH was further adjusted to between 4.5 and 5.0. The container was hand closed.

After 3 weeks of standing at room temperature (varied from 15 degrees C. to 30 degrees C.) the foods were removed from the jars for organoleptic assessment and microbiologic testing. a) On visual inspection the liquid phase surrounding the food in each container remained clear and transparent. b) respective foods each remained intact in their original shape and form. c) On olfactory inspection there was no malodorous scent. d) The foods retained their taste and texture. e) The aroma upon opening the container was similar to the expected odor of the freshly cooked foods. There was no acetic odor. f) The foods were palatable and recognizably that of the respective food products. g) A sample of the liquid phase was tested for microbial contamination using Hardy Diagnostics Compact Dry™ TC media plates according to the manufacturer's directions. There was no bacterial growth.

Additional Experiments for Shorter Time Periods (1 Week):

The following foods were separately prepared by either cooking, frying, boiling or roasting and placed in separate container after the cooking process. The foods were: fried white rice mixed with mushrooms and onions; cut up Kabocha Squash (2 cm squares) baked in olive oil. To the food filled containers an embodiment of the present invention consisting of an acid, a salt and a polyol were added. The initial pH was between 1 and 2. The pH was adjusted so that the final pH was 4.0. The pH was further adjusted to between 4.5 and 5.0. The containers were hand closed.

After one week of standing at room temperature (varied from 15 degrees C. to 30 degrees C.) the foods were removed from the jars for organoleptic assessment and microbiologic testing. a) On visual inspection the liquid phase surrounding the food in each container remained clear and transparent. b) respective foods each remained intact in their original shape and form. c) On olfactory inspection there was no malodorous scent at any time. d) The foods retained their taste and texture. The aroma upon opening the container was similar to the expected odor of the freshly cooked foods. There was no acetic odor. e) The foods were palatable and recognizably that of the respective food products. f) A sample of the liquid phase was tested for microbial contamination using Hardy Diagnostics Compact Dry™ TC media plates according to the manufacturer's directions. There was no bacterial growth.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described herein above are also contemplated and within the scope of the invention.

The invention claimed is:

1. A method of preserving food products, comprising the steps of:

placing a food product in an aqueous solution having a pH below 3.5, said aqueous solution comprising of a polyol, acid and salt;

adjustment said pH of said aqueous solution, with said food product there-in, until said pH is between 3.5 and 5.5;

closing at least some of said aqueous solution with said food in an air-tight container for a minimum of one week's time;

thereby causing, after said period:
a) said solution to become or remain clear;
b) said food to remain intact in it's original shape, color and texture; and
c) said food and said solution to lack a malodorous scent.

2. The method of claim 1, wherein said food in said air-tight container is at room temperature for said time, room temperature being defined as between 15 and 38 degrees Celsius.

3. The method of claim 2, wherein a malodorous scent is defined as one which is uncharacteristic of said food placed in said solution.

4. The method of claim 3, wherein a bacterial count of said food immediately after opening said air-tight container after said time is less than 10 per milliliter.

5. The method of claim 4, wherein said bacterial count of said food immediately after opening said air-tight container after said time is 0 in a milliliter of measured material.

6. The method of claim 4, wherein said food product is selected from the group consisting of pasta, a grain, tofu, a vegetable, a fruit, a cheese product, meat, and fish.

7. The method of claim 4, wherein said food product pre-treatment is chosen from the group of treatment consisting of boiling, frying, poaching, cooking, baking and roasting.

8. The method of claim 1, wherein said period of time is at least one year.

9. The method of claim 1, wherein said initial pH of said solution of polyol, acid and salt is at a pH of below pH 2.0.

10. The method of claim 1, wherein said initial pH of said solution of polyol, acid and salt is at a pH of below pH 3.0.

11. The method of claim 1, where said adjustment of said pH is to a pH of greater than 3.5.

12. The method of claim 1, where said adjustment of said pH is to a pH of greater than 4.0.

13. The method of claim 1, where said adjustment of said pH is to a pH of greater 4.5.

14. The method of claim 1, where said adjustment of said pH is to a pH of greater 5.0.

15. The method of claim 4, wherein said closing said food in an air-tight container for a period of time is for 2 weeks to 4 weeks.

16. The method of claim 4, wherein said closing said food in an air-tight container for a period of time is for 2 months to 4 months.

17. The method of claim 4, wherein said closing said food in an air-tight container for a period of time is for 6 months to 12 months.

* * * * *